US012663278B2

(12) United States Patent
Falkowski et al.

(10) Patent No.: US 12,663,278 B2
(45) Date of Patent: Jun. 23, 2026

(54) SYSTEMS AND METHODS FOR REAL-TIME DATA COVERAGE OPTIMIZATION

(71) Applicant: Toyota Jidosha Kabushiki Kaisha, Aichi-ken (JP)

(72) Inventors: Jan Falkowski, Seattle, WA (US); James Peter Biagioni, Seattle, WA (US); Eitan Gilad Mendelowitz, Northampton, MA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 68 days.

(21) Appl. No.: 18/951,478

(22) Filed: Nov. 18, 2024

(65) Prior Publication Data

US 2026/0139954 A1 May 21, 2026

(51) Int. Cl.
*G01C 21/34* (2006.01)
*G01C 21/00* (2006.01)

(52) U.S. Cl.
CPC ...... *G01C 21/3476* (2013.01); *G01C 21/3811* (2020.08)

(58) Field of Classification Search
CPC .... G01C 21/34; G01C 21/3476; G01C 21/38; G01C 21/3811
See application file for complete search history.

(56) References Cited

U.S. PATENT DOCUMENTS

| | | | |
|---|---|---|---|
| 8,576,069 B2 | 11/2013 | Nadeem et al. | |
| 9,792,821 B1 | 10/2017 | Yalla et al. | |
| 10,048,083 B2 * | 8/2018 | Inoue | B60L 53/62 |
| 10,690,507 B2 * | 6/2020 | Stephens | G01C 21/3453 |
| 11,943,687 B2 | 3/2024 | Neyama | |
| 2019/0294173 A1 * | 9/2019 | Szubbocsev | B60L 58/12 |
| 2022/0410925 A1 * | 12/2022 | Vardharajan | G01C 21/3407 |

FOREIGN PATENT DOCUMENTS

| | | |
|---|---|---|
| CN | 102185905 B | 7/2013 |
| CN | 106454719 B | 6/2019 |
| CN | 115002837 A | 9/2022 |
| JP | 4075649 B2 | 4/2008 |

* cited by examiner

*Primary Examiner* — Tan Q Nguyen
(74) *Attorney, Agent, or Firm* — Dinsmore & Shohl LLP

(57) ABSTRACT

Systems and methods for real-time map data coverage optimization are disclosed. A system includes one or more processors configured to determine a real-time map data collection coverage in an interested region, wherein real-time map data are collected by one or more consumer vehicles at locations of the consumer vehicles, determine whether one or more uncovered locations in the interested region are not covered by the locations of the one or more consumer vehicles, in response to determining that the one or more uncovered locations in the interested region are not covered by the locations of the one or more consumer vehicles, generate a route comprising the one or more uncovered locations based on a map of the interested region, and send an instruction to cause operation of a data-collecting vehicle to follow the route for real-time map data collection.

20 Claims, 4 Drawing Sheets

500

Determining a real-time map data collection coverage and one or more uncovered locations of the consumer vehicles in an interested region — 501

In response to determining that the one or more uncovered locations in the interested region are not covered by the locations of the one or more consumer vehicles, generating a route comprising the one or more uncovered locations based on a map of the interested region — 502

Sending an instruction to cause a data-collecting vehicle to follow the route locations for real-time map data collection — 503

SYSTEMS AND METHODS FOR REAL-TIME DATA COVERAGE OPTIMIZATION

TECHNICAL FIELD

The present disclosure relates to systems and methods for map data collection, more specifically, to systems and methods for map data collection using vehicles.

BACKGROUND

A real-time map performance relies on how well the map data generators for map data are spread out geographically. When uncontrolled map data generators, such as consumer vehicles, are unevenly distributed in an interested region, there's a chance that some areas are not covered by the uncontrolled map data generators, leading to incomplete real-time maps. Consequently, there's a need for deploying a map data collecting strategy, such as using a data-collecting vehicle, at the spot of uncovered areas to meet the temporary insufficient map data in demand for real-time data coverage.

SUMMARY

The present disclosure provides systems and methods for real-time map data coverage optimization using consumer vehicles.

In one embodiment, a system includes one or more processors configured to determine a real-time map data collection coverage in an interested region, wherein real-time map data are collected by one or more consumer vehicles at locations of the consumer vehicles, determine whether one or more uncovered locations in the interested region are not covered by the locations of the one or more consumer vehicles, in response to determining that the one or more uncovered locations in the interested region are not covered by the locations of the one or more consumer vehicles, generate a route comprising the one or more uncovered locations based on a map of the interested region, and send an instruction to cause operation of a data-collecting vehicle to follow the route for real-time map data collection.

In another embodiment, a method includes determining a real-time map data collection coverage in an interested region, wherein real-time map data are collected by one or more consumer vehicles at locations of the consumer vehicles, determining whether one or more uncovered locations in the interested region are not covered by the locations of the one or more consumer vehicles, in response to determining that the one or more uncovered locations in the interested region are not covered by the locations of the one or more consumer vehicles, generating a route comprising the one or more uncovered locations based on a map of the interested region, and sending an instruction to cause a data-collecting vehicle to follow the route for real-time map data collection.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
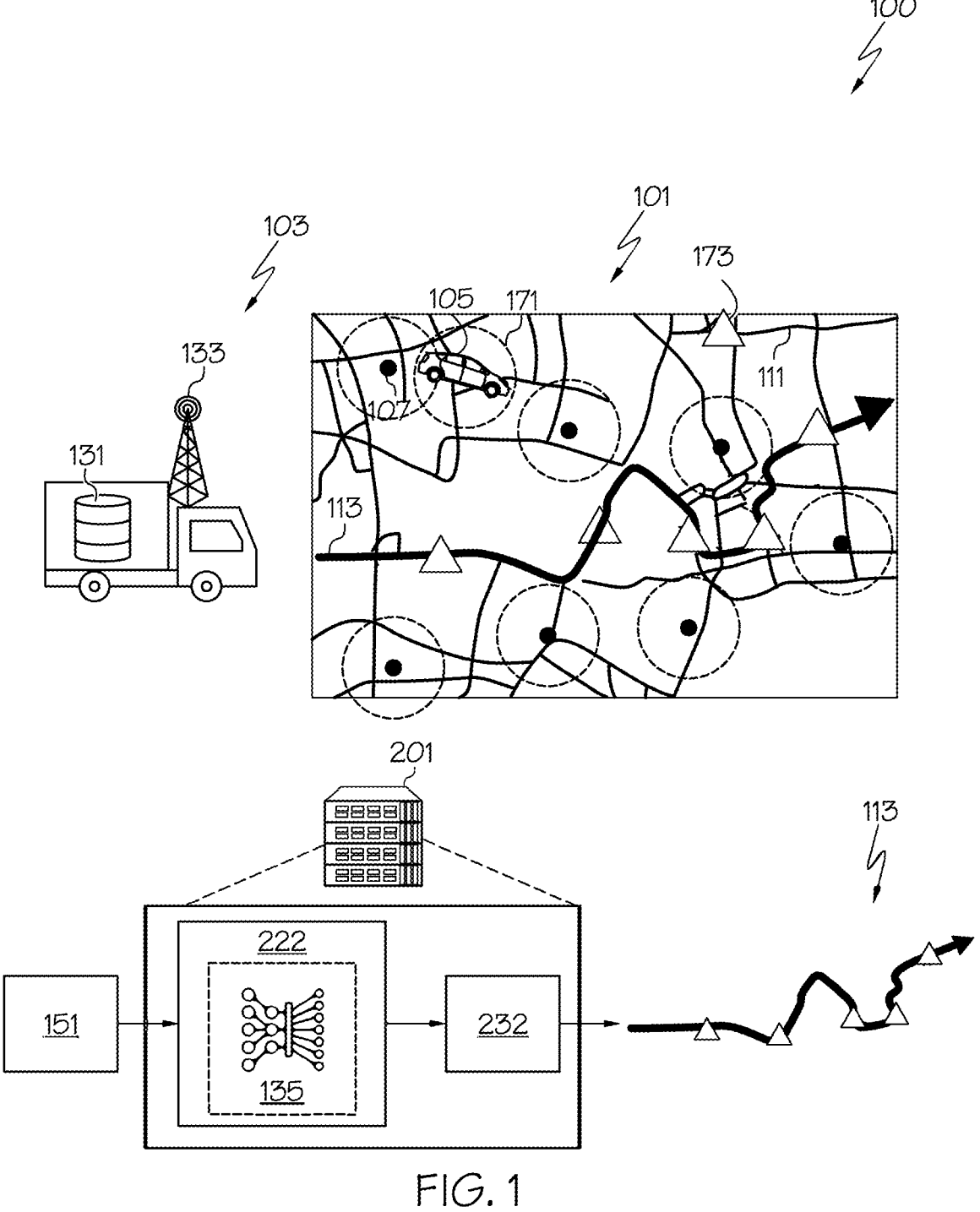
FIG. 1 schematically depicts an example system for data coverage optimization through route generation for a data transmission vehicle of the present disclosure, in accordance with one or more embodiments shown and described herewith.

The embodiments disclosed herein include systems and methods for optimizing real-time map data coverage to meet the demand for real-time map data generation. This optimization leverages uncontrolled map data generators, such as consumer vehicles, that are traveling within a region of interest. These vehicles, equipped with mobile sensors, collect and share map data as they move, providing dynamic and flexible data coverage. However, some areas within the region of interest may not be adequately covered by these uncontrolled data generators. To address this, the system and methods can, in real time, identify areas lacking sufficient coverage from the uncontrolled map data generators. Upon detecting or predicting these uncovered areas, the systems and methods can deploy one or more dedicated data-collecting vehicles to these locations in real time or at the predicted time and date. These vehicles are dispatched in a strategic manner, such as by following a determined route, to gather the necessary map data. Further, the disclosed systems and methods include selectively receiving map data from the consumer vehicles when more than desirable consumer vehicles are available at the same locations in the area. Thus, the systems and methods disclosed herein enhance the overall map data collection process by utilizing the data shared by uncontrolled map data generators while minimizing the need for additional dedicated data-collecting vehicles and the load of the data transmission to the bandwidth. Furthermore, the disclosed systems and methods eliminate the need for fixed map data collectors, such as stationary sensors and cameras installed at specific locations. By capitalizing on the benefits of mobile sensors mounted on moving vehicles, the disclosed systems and methods achieve more comprehensive and adaptable map data coverage. This reduces the dependency on costly, fixed infrastructure, allowing for efficient and flexible real-time data collection across the entire region of interest to provide complete and up-to-date map data coverage while minimizing resource expenditure.

As used herein, the singular forms "a," "an" and "the" include plural referents unless the context clearly dictates otherwise. Thus, for example, reference to "a" component includes aspects having two or more such components unless the context clearly indicates otherwise. Whenever possible, the same reference numerals will be used throughout the drawings to refer to the same or like parts.

Figure 2:
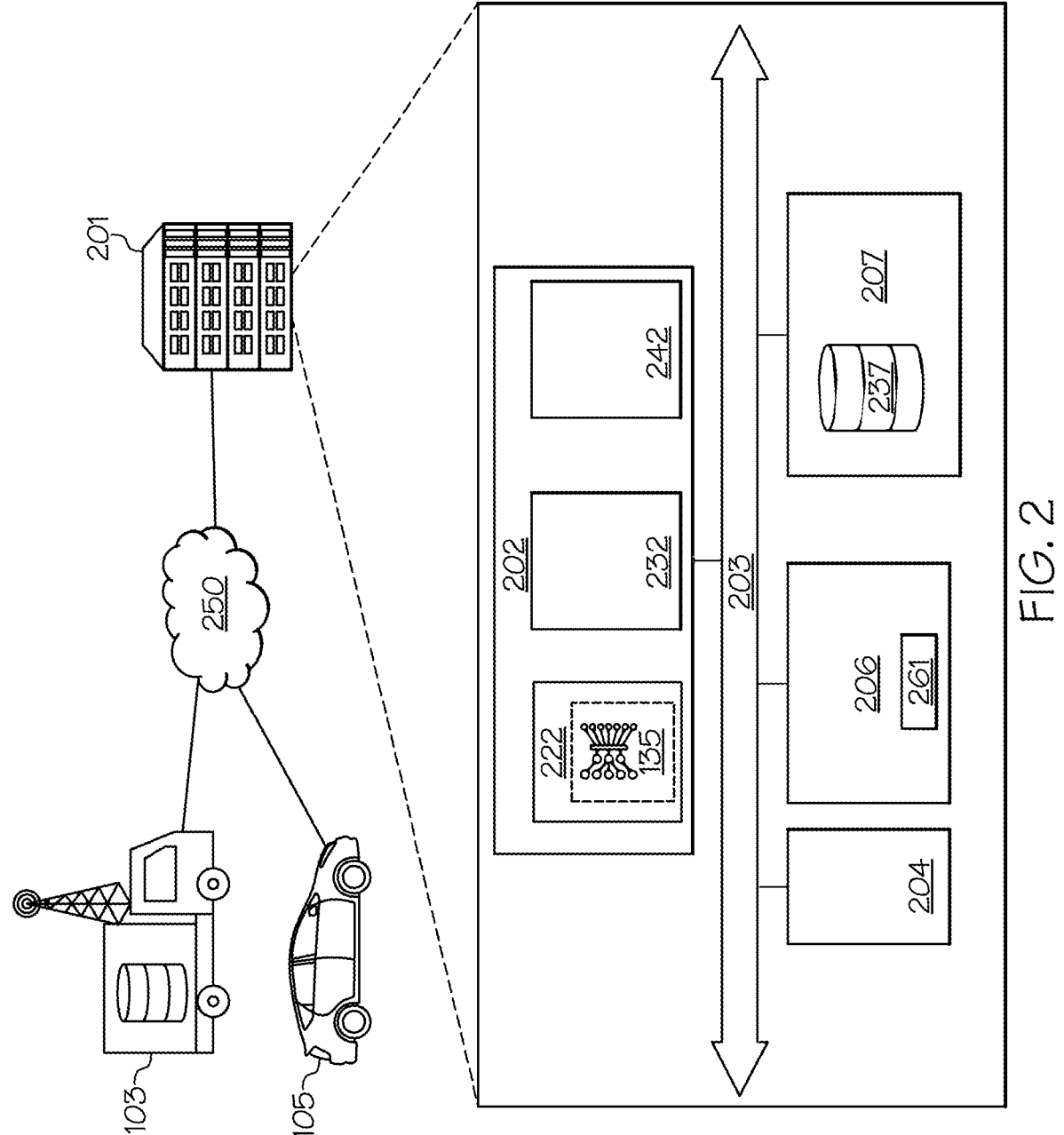
FIG. 2 schematically depicts example components of the data coverage optimization system of the present disclosure, according to one or more embodiments shown and described herein.
Figure 3:
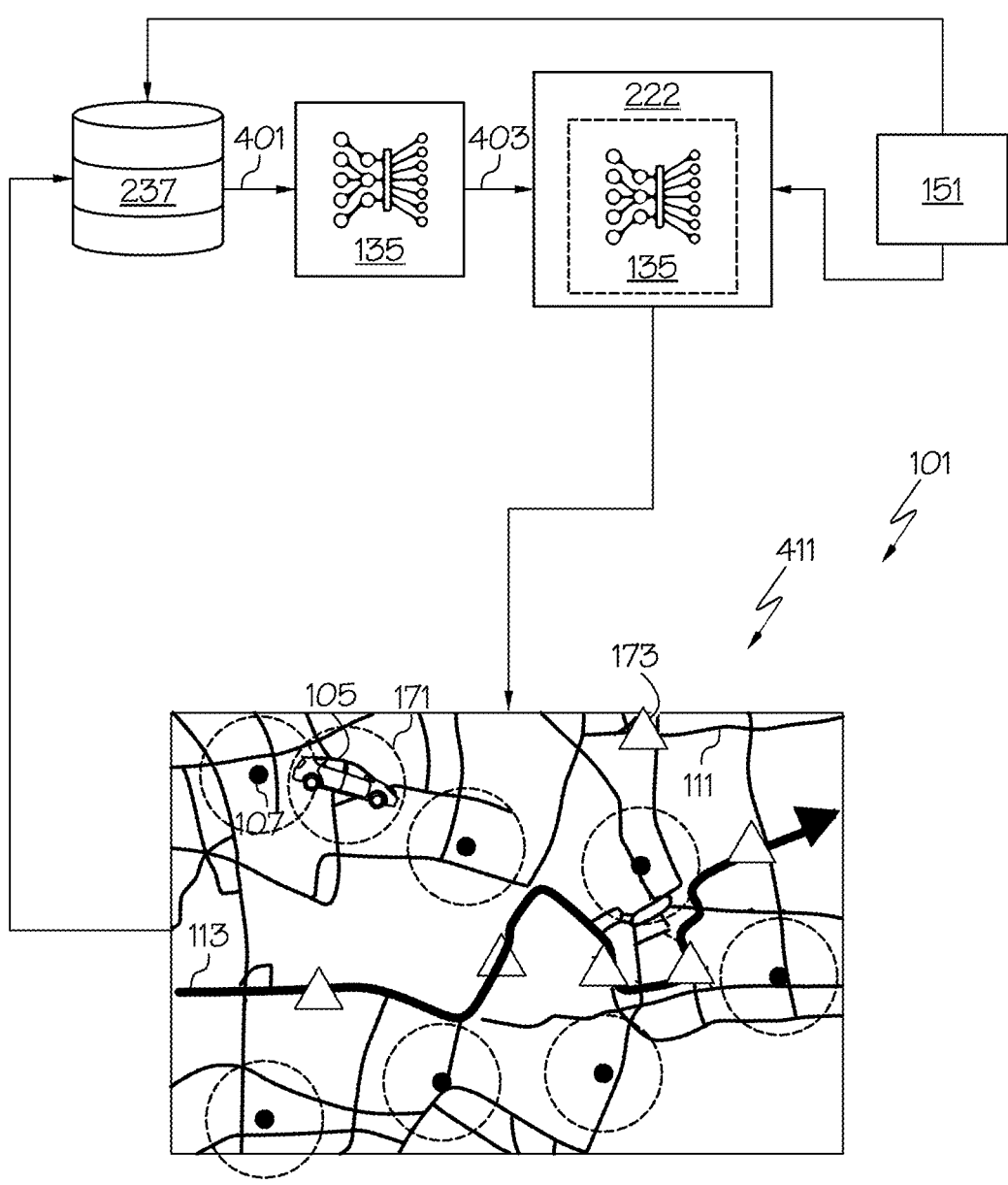
FIG. 3 depicts a block diagram for data coverage optimization through route generation using a trained neural network of the present disclosure, according to one or more embodiments shown and described herein.

Referring to figures, FIGS. 1 and 3 schematically depict an example real-time map data coverage optimization system 100. The real-time map data coverage optimization system 100 includes a controller 201 (as in FIG. 2). The controller 201 may include one or more modules, such as a location coverage module 222, a route generation module 232, and a consumer vehicle selection module 242, and a communication interface 261 (as in FIG. 2). The real-time map data coverage optimization system 100 may include a plurality of vehicles, such as one or more data-collecting vehicle 103. The real-time map data coverage optimization system 100 may include a communication interface 261 configured to communicate with the vehicles 103 and one or more consumer vehicles 105 or any map data generators, in an area 101, which a real-time map 411 (as in FIG. 3) is created. The area 101 may include road network 111. The consumer vehicles 105 may not be uncontrolled by the real-time map data coverage optimization system 100 and may be located in the area 101 in a scattered manner. The data-collecting vehicle 103, the consumer vehicles 105, and/or the map data generators, such as the consumer vehicles 105 may be operably to collect real-time map data at a location 107 of the data-collecting vehicle 103, the consumer vehicles 105, or the map data generators. In operation, each consumer vehicle 105 may transit real-time map data collected at the location 107 of the consumer vehicle 105 and transmit the real-time map data to the real-time map data coverage optimization system 100. The real-time map data coverage optimization system 100 may determine whether one or more uncovered locations 173 in the area 101 are not covered by the locations 107 of the one or more consumer vehicles 105. In response to determining that the one or more uncovered locations 173 in the area 101 are not covered by the locations 107 of the one or more consumer vehicles 105, the real-time map data coverage optimization system 100 may generate a route 113 including the one or more uncovered locations 173 based on a map of the area 101. In some embodiments, the uncovered locations 173 may be predicted by the real-time map data coverage optimization system 100. The real-time map data coverage optimization system 100 may operate one or more of the data-collecting vehicles 103 to follow the route 113 for real-time map data collection at least at the uncovered locations 173.

In some embodiments, the real-time map data coverage optimization system 100 may project one or more routes 113 to traverse the area 101 for the data-collecting vehicle 103 moving within the area 101 to collect map data. In such a scenario, the real-time map data coverage optimization system 100 may primarily rely on the data-collecting vehicle 103 to collect the map data and use the consumer vehicles 105 as a secondary map data source. For example, the real-time map data coverage optimization system 100 may request map data from the consumer vehicle 105 when the data-collecting vehicles are unavailable to cover some of the locations in the area 101.

In some embodiments, the real-time map data coverage optimization system 100 may include one or more neural networks 135. The neural networks may be pre-trained. The real-time map data coverage optimization system 100 may use one of the pre-trained neural networks to generate one or more predicted uncovered locations 173 in the area 101. Accordingly, the generated route 113 may include the one or more predicted uncovered locations 173. The one or more predicted uncovered locations 173 may be generated based on historical data stored at the data storage component 207 (as in FIG. 2) of the real-time map data coverage optimization system 100, such as, without limitation, consumer vehicle distributions, weather, hours in the interested region, and the like. The one or more neural networks 135 may be trained with training data 237 stored at the data storage. The training data may include consumer vehicle distributions in one or more sample areas. The training data may also include historical consumer vehicle distributions, historical map data quality, historical hour, historical weather, and historical uncovered locations in the interested region.

In some embodiments, the real-time map data coverage optimization system 100 may determine, based on historical consumer vehicle distributions, whether the one or more consumer vehicles 105 are not expected to cover one or more predicted uncovered locations 173 within the area at a selected time on a specific date. The real-time map data coverage optimization system 100, in response to determining that the one or more predicted uncovered locations 173 within the area are not expected to be covered at the selected time on the specific date, may generate a predicted route 113. The predicted route 113 may include the one or more predicted uncovered locations 173 at the selected time on the specific date. The real-time map data coverage optimization system 100 may operate the data-collecting vehicles 103 to follow the predicted route 113 at the selected time on the specific date to capture map data at the predicted uncovered locations 173.

In some embodiments, the real-time map data coverage optimization system 100 may include the consumer vehicle selection module 242. The consumer vehicle selection module 242 may determine whether a density of consumer vehicles 105 at one or more locations 107 (saturated locations) is beyond a saturated threshold. The saturated threshold may be determined based on required map details for the real-time map, e.g., high-resolution images for high-resolution maps, and the like. The saturated threshold may be satisfied in terms of a sufficient number of available consumer vehicles 105 in the area, sufficient image resolutions, and sufficient accuracy of the sensory data, such as GPS locations, temperature, moisture, distance, and the like. In response to determining that the density of consumer vehicles 105 at the one or more locations 107 is beyond the saturated threshold, the consumer vehicle selection module 242 may select one or more of the one or more consumer vehicles 105 at the one or more locations 107 to receive map data and refrain from receiving the map data collected by consumer vehicles 105 other than the selected consumer vehicles 105. The selected one or more consumer vehicles 105 may equipped with cameras with higher resolutions, field of view, imaging depth, position sensors with more accurate GPS position, and other sensors with more desirable accuracy for real-time map generation. It should be appreciated that in some embodiments, the real-time map data coverage optimization system 100 may select consumer vehicles 105 with sensors of lower resolution or accuracy due to other considerations, such as available bandwidth at the time and day. In some embodiments, the consumer vehicle selection module 242 may predict the saturation of the locations 107 based on historical consumer vehicle distributions and historical map data collection in the area. In some embodiments, the selection of the consumer vehicles 105 may be based on map data quality of the consumer vehicles 105 and associations between the consumer vehicles 105 and the real-time map data coverage optimization system 100 (e.g., the same brand).

In embodiments, the consumer vehicles 105 and/or the map data generators may be any moving objects, devices, and/or equipment that may generate map data, for example, using one or more onboard sensors. The map data may include geospatial information, traffic conditions, and road details at the location 107 of the consumer vehicle 105 or the data-collecting vehicle 103. For example, the consumer vehicles 105 and the map data generators may include onboard cameras, proximity sensors, temperature sensors, image sensors, pressure sensors, location sensors (e.g., global positioning system (GPS)), and the like. The map data generators may include commercial vehicles, mobile mapping vehicles, mobile devices (e.g., smartphones and tablets) traveled with a driver when driving a vehicle, The consumer vehicles and/or the map data generators, aerial vehicles (e.g., drones), satellites, self-driving vehicles, aviation systems, public transportation vehicles. Accordingly, the consumer vehicles 105 and/or the map data generators may collect map data, such as, without limitation, traffic conditions, emergency events along the road, weather conditions (e.g., temperature, wind, precipitation, and the like), air quality, water levels, earth observation, and topographical data (e.g., elevation data, contour lines, and the like), building footprints, infrastructure information, GPS coordinates, and any data and information that can be generated based on onboard sensors.

Throughout the disclosure, it should be understood that the map data generators may also function as consumer vehicle 105, where applicable. In embodiments, the map data generator may be used interchangeably with the consumer vehicle 105. Additionally, where the specification references consumer vehicle 105, it should be interpreted as including the map data generators, where the map data generators serve the same purpose or fulfill the same role within the described system, method, or apparatus. This interchangeability is intended to ensure that the scope of the disclosure covers all variations and embodiments where the consumer vehicles 105 and the map data generators can be functionally equivalent.

In embodiments, each of the vehicles 103 and 105 may be an automobile or any other passenger or non-passenger vehicle such as, for example, a terrestrial, aquatic, and/or airborne vehicle. Each of the vehicles 103 and 105 may be an autonomous vehicle that navigates its environment with limited human input or without human input. Each of the vehicles 103 and 105 may move on a road of the road network 111 in the area 101. Each of the vehicles 103 and 105 may include actuators for driving the vehicle, such as a motor, an engine, or any other powertrain. The vehicles 103 and 105 may move on various surfaces, such as, without limitations, roads, highways, streets, expressway, bridges, tunnels, parking lots, garages, off-road trails, railroads, or any surfaces where the vehicles may operate. Each consumer vehicle 105 may include a communication device, such as vehicle network interface hardware, operable to wirelessly communicate with each other, the data-collecting vehicle 103, and the controller 201. Each data-collecting vehicle 103 may include a communication device, such as data transmission interface hardware 133, operable to wirelessly communicate with the consumer vehicles 105 and/or the controller 201.

In embodiments, each consumer vehicle 105 may continuously capture map data and transmit the captured map data to the real-time map data coverage optimization system 100. Each of the consumer vehicles 105 may include a network interface hardware and communicate the data-collecting vehicle 103 and the controller 201 via wireless communications 250. In operation, the consumer vehicles 105 may be driven by their users for their own purpose and thus are not controlled by the real-time map data coverage optimization system 100. Accordingly, there may be probability that some of the locations (i.e., uncovered locations 173) are not covered by any consumer vehicles 105 and thus, the real-time map data coverage optimization system 100 may need to collect map data in these uncovered locations 173 by other means, such as sending a data-collecting vehicle 103 to the uncovered locations 173 to collect the map data.

In embodiments, each data-collecting vehicle 103 may include a map sensor 131 and the data transmission interface hardware 133. The map sensor 131 may be used to continuously capture map data while the data-collecting vehicle 103 moves to different locations. The data transmission interface hardware 133 may be configured to wirelessly communicate with the one or more consumer vehicles 105 and the controller 201. In practice, the data-collecting vehicle 103 may move on the roads of the road network 111 in the area 101 and provide data services to the consumer vehicles 105 and/or the controller 201 within a coverage scope 171 of the data-collecting vehicle 103. The map sensor 131 may include onboard cameras, proximity sensors, temperature sensors, image sensors, pressure sensors, location sensors, and the like. Map data generators may include commercial vehicles, mobile mapping vehicles, mobile devices (e.g., smartphones and tablets), and the like. The map sensor may collect map data, such as, without limitation, traffic conditions, emergency events along the road, weather conditions (e.g., temperature, wind, precipitation, and the like), air quality, water levels, earth observation, and topographical data (e.g., elevation data, contour lines, and the like), building footprints, infrastructure information, GPS coordinates, and any data and information that can be generated based on onboard sensors.

In embodiments, each consumer vehicle 105 or the data-collecting vehicle 103 may collect map data at the location 107 with a coverage scope 171 around the location 107. The coverage scope 171 may have a coverage radius. The coverage scope 171 of each location 107 may depend on the sensor detection radius of the various onboard sensors on the consumer vehicle 105 or the data-collecting vehicle 103. For example, one or more cameras equipped on an example consumer vehicle 105 may have a field of view of 90 degrees to 120 degrees, and a twenty-meter depth for desirable resolution and details. In another example, an example data-collecting vehicle 103 may include one or more cameras with a field of view of 360 degrees and a fifty-meter depth for desirable resolution and details. The coverage scope 171 may also depend on the terrain and obstructions. Accordingly, in some embodiments, the real-time map data coverage optimization system 100 may selectively receive the map data from some of the consumer vehicles 105 for better image quality, more accurate map data, and greater coverage radius when more than one consumer vehicles 105 is present at the same locations (saturated locations).

The wireless communication 250 (in FIG. 2) may connect various components, the vehicles 103 and 105 of the real-time map data coverage optimization system 100, and allow signal transmission between the various components and the vehicles of the real-time map data coverage optimization system 100. In some embodiments, the wireless communications 250 may facilitate the transmission of wireless signals, such as WiFi, Bluetooth®, Near Field Communication (NFC), and the like.

FIG. 2 schematically depicts example components of the controller 201 of the real-time map data coverage optimization system 100. The controller 201 may communicate with the data-collecting vehicle 103 and the consumer vehicles 105 through the wireless communication 250. While FIG. 2 depicts one data-collecting vehicle 103, more than two data-collecting vehicles 103 may be included in the real-time map data coverage optimization system 100. Similarly, while FIG. 2 depicts one consumer vehicles 105, more than two consumer vehicles 105 may be included in the real-time map data coverage optimization system 100.

The controller 201 may include one or more processors 204. Each of the one or more processors 204 may be any device capable of executing machine-readable and executable instructions. The instructions may be in the form of a machine-readable instruction set stored in data storage component 207 and/or the memory component 202. Accordingly, each of the one or more processors 204 may be a controller, an integrated circuit, a microchip, a computer, or any other computing device. The one or more processors 204 are coupled to a communication path 203 that provides signal interconnectivity between various modules of the system. Accordingly, the communication path 203 may communicatively couple any number of processors 204 with one another, and allow the modules coupled to the communication path 203 to operate in a distributed computing environment. Specifically, each of the modules may operate as a node that may send and/or receive data. As used herein, the term "communicatively coupled" means that coupled components are capable of exchanging data signals with one another such as, for example, electrical signals via a conductive medium, electromagnetic signals via air, optical signals via optical waveguides, and the like.

Accordingly, the communication path 203 may be formed from any medium that is capable of transmitting a signal such as, for example, conductive wires, conductive traces, optical waveguides, or the like. In some embodiments, the communication path 203 may facilitate the transmission of wireless signals, such as WiFi, Bluetooth®, Near Field Communication (NFC), and the like. Moreover, the communication path 203 may be formed from a combination of mediums capable of transmitting signals. In one embodiment, the communication path 203 comprises a combination of conductive traces, conductive wires, connectors, and buses that cooperate to permit the transmission of electrical data signals to components such as processors, memories, sensors, input devices, output devices, and communication devices. Accordingly, the communication path 203 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal wave, triangular wave, square-wave, vibration, and the like, capable of traveling through a medium.

The controller 201 may include one or more memory components 202 coupled to the communication path 203. The one or more memory components 202 may comprise RAM, ROM, flash memories, hard drives, or any device capable of storing machine-readable and executable instructions such that the machine-readable and executable instructions can be accessed by the one or more processors 204. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory components 202. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory components 202 may include the location coverage module 222, the route generation module 232, and the consumer vehicle selection module 242. Each of the modules 222, 232, and 242 may include, but are not limited to, routines, subroutines, programs, objects, components, data structures, and the like for performing specific tasks or executing specific data types as will be described below. The data storage component 207 stores training data and historical data 237. The training data and historical data 237 may include historical consumer vehicle distributions, historical map data quality, historical hour, historical weather, and historical uncovered locations in the interested region, properties, such as, without limitations, brands of the one or more consumer vehicles 105 and associations between the one or more consumer vehicles 105 and the real-time map data coverage optimization system 100, and distributions of the one or more vehicles sending the data in the area 101. The modules 222, 232, and 242 may also be stored in the data storage component 207 during operating or after operation.

The controller 201 may include network interface hardware 206 for communicatively coupling the controller 201 to external devices, such as the location 107, the vehicles 103 and 105. The network interface hardware 206 may include a communication interface 261 configured to communicate with the vehicles 103 and 105. The network interface hardware 206 can be communicatively coupled to the communication path 203 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 206 includes hardware configured to operate in accordance with the Bluetooth® wireless communication protocol. The communication interface 261 of the controller 201 may transmit its data to the consumer vehicles 105 or the data-collecting vehicle 103.

The controller 201 may be communicatively coupled to the consumer vehicles 105 or the data-collecting vehicle 103 by the wireless communication 250. In one embodiment, the wireless communication 250 may include one or more computer networks (e.g., a personal area network, a local area network, or a wide area network), cellular networks, satellite networks, and/or a global positioning system and combinations thereof. Accordingly, the controller 201 can be communicatively coupled to the wireless communication 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near-field communication protocols. Suitable cellular networks include, but are not limited to, technologies such as LTE, WiMAX, UMTS, CDMA, and GSM.

Referring back to FIGS. 1 and 3, the real-time map data coverage optimization system 100 may predict the saturation of one or more of the locations 107 in the area 101 at a specific time (hour, day, month, or year) and generate a route 113 for one or more of the data-collecting vehicle 103. The real-time map data coverage optimization system 100 may use the location coverage module 222, which includes a trained neural network 135, to determine or predict, at a specific time (hour, day, month, or year), the one or more uncovered locations 173 and/or the one or more of the saturated locations in the area 101 based on the input data 151. The location coverage module 222 may generate a map 411 of the predicted saturated locations and/or the uncovered locations 173. The generated map 411 may be fed to the module 232 to generate a route 113 for the data-collecting vehicle 103 to move along the route 113 at the specific time to the uncovered locations 173 to coordinate with the one or more consumer vehicles 105 to capture map data for real-time map data coverage optimization.

In embodiments, the input data 151 may include historical data requests and historical data quality, weather, and hour in the area 101. The input data 151 may include real-time consumer vehicle distribution along with the coverage scopes 171 of the consumer vehicles 105. The input data 151 may further include properties of the one or more consumer vehicles 105 in the area 101. The properties of the consumer vehicles 105 may include brands of the consumer vehicles 105 and associations between the consumer vehicles 105 and the real-time map data coverage optimization system 100. For example, at some of the locations 107, the real-time map data coverage optimization system 100 may be associated with one or more brands of vehicles and may receive map data solely from a selected brand of the consumer vehicles 105 or provide limited map data service to the consumer vehicles 105 of any non-associated brands. The input data 151 may be included in the training data and historical data 237 of the data storage component 207 of the controller 201.

In some embodiments, as illustrated in FIGS. 1 and 3, the location coverage module 222, using the trained neural network 135, identifies one or more uncovered locations 173 and/or the saturated locations at a specific time or in a span of a short period (such as rush hours). The uncovered locations 173 and the saturated locations may be scattered within the area 101 in the map 411. Some of the uncovered locations 173 may be located along the main traffic roads in the road network 111 and some of the uncovered locations 173 (such as the one at the upper right of the map 411) may be located away from the main traffic roads in the road network 111.

As illustrated in FIG. 1, the route generation module 232, based on the location of the uncovered locations 173, may generate a route 113. The real-time map data coverage optimization system 100 may instruct the data-collecting vehicle 103 to follow the route 113 to the uncovered locations 173 to capture the real-time data map. In some embodiments, the route 113 may not cover all the uncovered locations 173 due to limited resources. In the example of FIG. 1, the route 113 does not pass all uncovered locations 173. In such a case, in some embodiments, the real-time map data coverage optimization system 100 may instruct another data-collecting vehicle 103 to the spot not covered by the generated route 113.

Referring back to FIG. 3, a block diagram for predicting uncovered locations 173 using a trained neural network 135 is depicted. In embodiments, the modules 222, 232, and 242 of the real-time map data coverage optimization system 100 may include one or more machine learning algorithms or neural networks, such as the neural network 135 of the location coverage module 222.

The modules 222, 232, and 242 may be trained and provided machine learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (Sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one-to-one, one-to-many, many-to-one, and/or many-to-many (e.g., sequence-to-sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof. In some embodiments, a convolutional neural network (CNN) may be utilized. For example, a convolutional neural network (CNN) may be used as an ANN that, in the field of machine learning, for example, is a class of deep, feed-forward ANNs applied for audio analysis of the recordings. CNNs may be shift or space-invariant and utilize shared-weight architecture and translation. Further, each of the various modules may include generative artificial intelligence algorithms. The generative artificial intelligence algorithm may include a general adversarial network (GAN) that has two networks, a generator model and a discriminator model. The generative artificial intelligence algorithm may also be based on variation autoencoder (VAE) or transformer-based models.

The modules 222, 232, and 242 may be pre-trained using training data of the map data coverage optimization, including ground-truth examples and scenarios where multiple entities (e.g. consumer vehicles 105 and data-collecting vehicle 103) provide real-time map data while considering the locations of the entities, map data range and capacity, and factors (for example, without limitation, time of the day, environments, weather, etc.). The pre-training may include labeling the entities and desirable map data coverage optimization results in the examples and scenarios and using one or more neural networks to learn to predict the desirable and undesirable data coverage results based on the training data. The pre-training may further include fine-tuning, evaluation, and testing steps. The one or more modules 222, 232, and 242 may be continuously trained using the real-world collected data to adapt to changing conditions and factors and improve the performance over time.

As illustrated in FIG. 3, the neural network 135 may be fed 401 with the training data and historical data 237 for training. The training data and historical data 237 may include historical consumer vehicle distributions, historical map data quality, historical hour, historical weather, and historical uncovered locations in the interested region, properties, such as, without limitations, brands of the one or more consumer vehicles 105 and associations between the one or more consumer vehicles 105 and the real-time map data coverage optimization system 100, and distributions of the one or more vehicles sending the data in the area 101. The input data 151 including the real-time map data of the locations 107 and the generated map 411 may be continuously stored in the training data and historical data 237 and fed to the neural network 135 for continuous training and tuning. The trained neural network 135 may be continuously updated 403 through usage to further generate predicted saturation of the locations 107, the uncovered locations 173, and the map 411 of the predicted uncovered locations 173 and the saturated locations.

Figure 4:
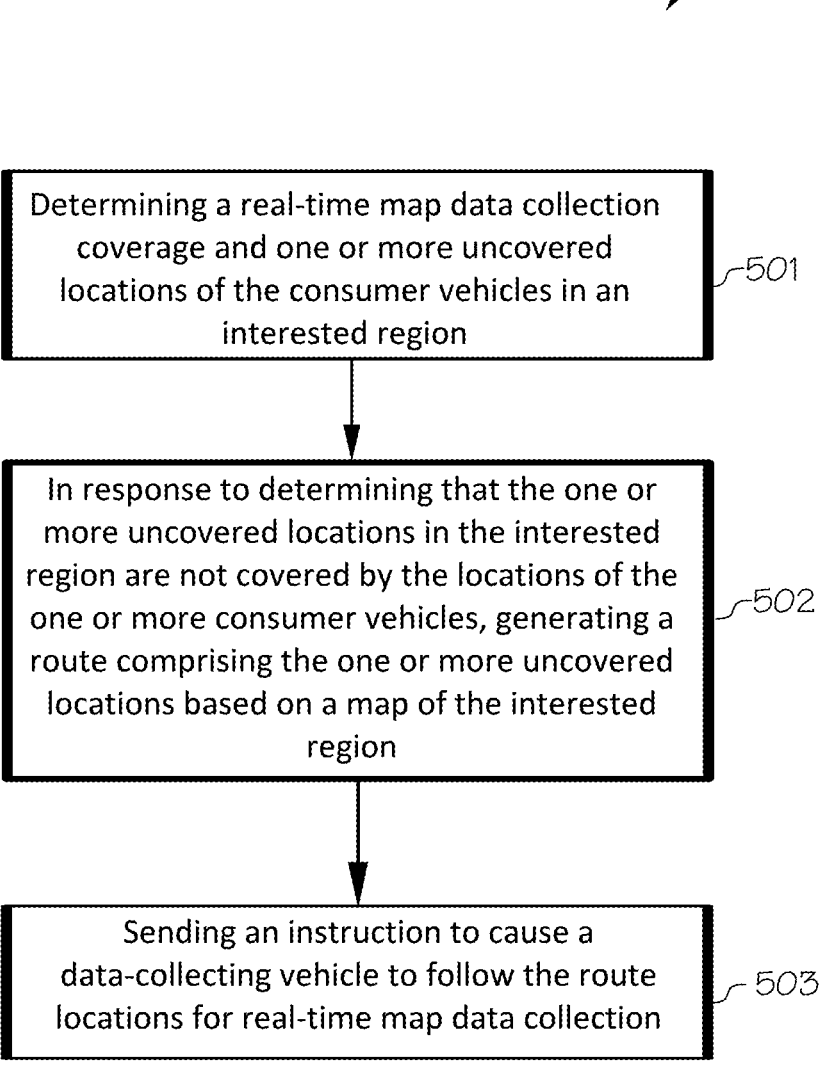
FIG. 4 depicts a flowchart for data coverage optimization of the present disclosure, according to one or more embodiments shown and described herein.

FIG. 4 depicts a flowchart for method 500 for map data coverage optimization of the present disclosure. At block 501, the method 500 may include determining a real-time map data collection coverage in an interested region (e.g., area 101), and determining whether one or more uncovered locations 173 in an interested region (e.g., area 101) are not covered by locations 107 of the one or more consumer vehicles 105. Each consumer vehicle 105 may transit real-time map data collected at a location 107 of the consumer vehicle 105. At block 502, the method 500 may include, in response to determining that the one or more uncovered locations 173 in the interested region (area 101) are not covered by the locations 107 of the one or more consumer vehicles 105, generating a route 113 including the one or more uncovered locations 173 based on a map 411 of the interested region (area 101). At block 503, the method 500 may include sending an instruction to cause a data-collecting vehicle 103 to follow the route 113 to the one or more uncovered locations 173 for real-time map data collection. In some embodiments, the method 500 may further comprise operating the data-collecting vehicle 103 to follow the route 113 for real-time data collection.

In some embodiments, the method 500 may further include generating, using a trained neural network 135, one or more predicted uncovered locations 173 in the interested region (area 101), and the route further comprises the one or more predicted uncovered locations 173. The one or more predicted uncovered locations 173 may be generated based on historical consumer vehicle distributions, weather, and hours in the interested region. The neural network 135 may be trained with training data comprising consumer vehicle distributions in sample regions, historical consumer vehicle distributions, historical map data quality, historical hour, historical weather, and historical uncovered locations in the interested region (area 101).

In some embodiments, the method 500 may further include determining, based on historical consumer vehicle distributions, whether the one or more consumer vehicles 105 are not expected to cover one or more predicted uncovered locations 173 within the interested region (area 101) at a selected time on a specific date. The method 500 may further include in response to determining that the one or more predicted uncovered locations 173 within the interested region are not expected to be covered at the selected time on the specific date, generating a predicted route 113 including the one or more predicted uncovered locations 173 at the selected time on the specific date. The method 500 may further include operating the data-collecting vehicle 103 to follow the predicted route 113 at the selected time on the specific date. In some embodiments, the real-time map data may include geospatial information, traffic conditions, and road details at the location of the consumer vehicle or the data-collecting vehicle.

In some embodiments, the method 500 may further include determining whether a density of consumer vehicles 105 at one or more saturated locations is beyond a saturated threshold. The one or more saturated locations may be predicted based on historical consumer vehicle distributions and historical map data collection in the interested region. The method 500 may further include in response to determining that the density of consumer vehicles 105 at the one or more saturated locations is beyond the saturated threshold, selecting one or more of the one or more consumer vehicles 105 at the one or more saturated locations based on map data quality of the consumer vehicles 105 and associations between the consumer vehicles 105 and the real-time map data coverage optimization system 100, and refraining from receiving the real-time map data collected by vehicles 105 other than the selected one or more of the one or more consumer vehicles 105.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising one or more processors configured to:

determine a real-time map data collection coverage in an interested region, wherein real-time map data are collected by one or more consumer vehicles at locations of the consumer vehicles;

determine whether one or more uncovered locations in the interested region are not covered by the locations of the one or more consumer vehicles;

in response to determining that the one or more uncovered locations in the interested region are not covered by the locations of the one or more consumer vehicles, generate a route comprising the one or more uncovered locations based on a map of the interested region; and send an instruction to cause operation of a data-collecting vehicle to follow the route for real-time map data collection.

2. The system of claim 1, wherein the one or more processors are further configured to generate, using a trained neutral network, one or more predicted uncovered locations in the interested region, and the route further comprises the one or more predicted uncovered locations.

3. The system of claim 2, wherein the one or more predicted uncovered locations are generated based on historical consumer vehicle distributions, weather, and hours in the interested region.

4. The system of claim 2, wherein the neural network is trained with training data comprising consumer vehicle distributions in one or more sample regions.

5. The system of claim 2, wherein the neural network is trained with training data comprising historical consumer vehicle distributions, historical map data quality, historical hour, historical weather, and historical uncovered locations in the interested region.

6. The system of claim 1, wherein the one or more processors are configured to:

determine, based on historical consumer vehicle distributions, whether the one or more consumer vehicles are not expected to cover one or more predicted uncovered locations within the interested region at a selected time on a specific date; and in response to determining that the one or more predicted uncovered locations within the interested region are not expected to be covered at the selected time on the specific date, generate a predicted route comprising the one or more predicted uncovered locations at the selected time on the specific date.

7. The system of claim 6, wherein the one or more processors are further configured to operate the data-collecting vehicle to follow the predicted route at the selected time on the specific date.

8. The system of claim 1, wherein the real-time map data comprises geospatial information, traffic conditions, and road details at the locations of the consumer vehicles or the data-collecting vehicle.

9. The system of claim 1, wherein the one or more processors are further configured to:

determine whether a density of consumer vehicles at a saturated location is beyond a saturated threshold;

in response to determining that the density of consumer vehicles at the saturated location is beyond the saturated threshold, select one or more of the one or more consumer vehicles at the saturated location; and refrain from receiving the real-time map data collected by vehicles other than the selected one or more of the one or more consumer vehicles at the saturated location.

10. The system of claim 9, wherein the saturated location is predicted based on historical consumer vehicle distributions and historical map data collection in the interested region.

11. The system of claim 9, wherein the one or more of the one or more consumer vehicles are selected based on map data quality of the consumer vehicles and associations between the consumer vehicles and the system.

12. A method comprising:

determining a real-time map data collection coverage in an interested region, wherein real-time map data are collected by one or more consumer vehicles at locations of the consumer vehicles;

determining whether one or more uncovered locations in the interested region are not covered by the locations of the one or more consumer vehicles;

in response to determining that the one or more uncovered locations in the interested region are not covered by the locations of the one or more consumer vehicles, generating a route comprising the one or more uncovered locations based on a map of the interested region; and sending an instruction to cause a data-collecting vehicle to follow the route for real-time map data collection.

13. The method of claim 12, wherein the method further comprises generating, using a trained neutral network, one or more predicted uncovered locations in the interested region, and the route further comprises the one or more predicted uncovered locations.

14. The method of claim 13, wherein the one or more predicted uncovered locations are generated based on historical consumer vehicle distributions, weather, and hours in the interested region.

15. The method of claim 13, wherein the neural network is trained with training data comprising consumer vehicle distributions in sample regions, the historical consumer vehicle distributions, historical map data quality, historical hour, historical weather, and historical uncovered locations in the interested region.

16. The method of claim 12, wherein the method further comprises:

determining, based on historical consumer vehicle distributions, whether the one or more consumer vehicles are not expected to cover one or more predicted uncovered locations within the interested region at a selected time on a specific date; and in response to determining that the one or more predicted uncovered locations within the interested region are not expected to be covered at the selected time on the specific date, generating a predicted route comprising the one or more predicted uncovered locations at the selected time on the specific date.

17. The method of claim 16, wherein the method further comprises operating the data-collecting vehicle to follow the predicted route at the selected time on the specific date.

18. The method of claim 12, wherein the real-time map data comprises geospatial information, traffic conditions, and road details at the locations of the consumer vehicles or the data-collecting vehicle.

19. The method of claim 12, wherein the method further comprises:

determining whether a density of consumer vehicles at a saturated location is beyond a saturated threshold;

in response to determining that the density of consumer vehicles at the saturated location is beyond the saturated threshold, selecting one or more of the one or more consumer vehicles at the saturated location based on map data quality of the consumer vehicles and associations between the consumer vehicles and a real-time map system; and refraining from receiving the real-time map data collected by vehicles other than the selected one or more of the one or more consumer vehicles at the saturated location.

20. The method of claim 19, wherein the one or more saturated locations are predicted based on historical consumer vehicle distributions and historical map data collection in the interested region.

\* \* \* \* \*